United States Patent [19]

Mishcon

[11] E Re. 28,519

[45] Reissued Aug. 19, 1975

[54] CIRCULAR KNITTING MACHINE WITH PATTERN WHEELS

[75] Inventor: Lester Mishcon, New York, N.Y.

[73] Assignee: The Singer Company, New York, N.Y.

[22] Filed: July 19, 1973

[21] Appl. No.: 380,633

Related U.S. Patent Documents

Reissue of:

[64] Patent No.: 3,513,666
Issued: May 26, 1970
Appl. No.: 670,097
Filed: Sept. 25, 1967

U.S. Applications:

[63] Continuation of Ser. No. 99,465, Dec. 18, 1970, abandoned.

[52] U.S. Cl. ..... 66/50 A; 66/54
[51] Int. Cl.[2] ..... D04B 15/76
[58] Field of Search ..... 66/50 A, 36 A, 36 B, 40, 66/25, 42, 38, 57, 54

[56] References Cited

UNITED STATES PATENTS

| | | | |
|---|---|---|---|
| 868,276 | 10/1907 | Klemm | 66/38 X |
| 1,697,488 | 1/1929 | Ames | 66/36 A |
| 1,925,450 | 9/1933 | Levin | 66/50 A |
| 2,000,837 | 5/1935 | Gorman et al. | 66/50 A |
| 2,068,179 | 1/1937 | Horrocks | 66/50 A |
| 2,124,304 | 7/1938 | Lombardi | 66/25 |
| 3,145,548 | 8/1964 | Mishcon | 66/50 A |
| 3,274,800 | 9/1966 | Mishcon et al. | 66/50 A |
| 3,283,540 | 11/1966 | Levin | 66/50 A |
| 3,335,581 | 8/1967 | Pernick | 66/50 A |
| 3,335,582 | 8/1967 | Mishcon | 66/54 X |

FOREIGN PATENTS OR APPLICATIONS

| | | | |
|---|---|---|---|
| 1,201,220 | 7/1959 | France | 66/57 |
| 276,726 | 8/1927 | United Kingdom | 66/42 |
| 510 | 1915 | United Kingdom | |

*Primary Examiner*—Wm. Carter Reynolds
*Attorney, Agent, or Firm*—Robert E. Smith; Edward L. Bell; William V. Ebs

[57] ABSTRACT

A pattern wheel circular knitting machine is described, which machine provides [double the] *increased* production and patterning capability of equivalent-sized prior art machines. Such features are brought about by the utilization, in a pattern wheel machine, of two-butt needles, a first butt of each such needle being for selective only engagement with pattern wheels, and the second butt of each such needle being for engagement only with cams associated with each pattern wheel, the cams associated with each pattern wheel including a raise cam for placing the needles in such positions that the pattern wheel may eventually selectively operate on the respective first butts, a stitch cam for lowering needles as they move beyond the pattern wheel and a placer cam between the raise and stitch cams. Such practice permits the pattern wheels and associated cams to be packed around the periphery of the knitting machine, with attendant high cloth production and patterning versatility. The raise and placer cams are guarded to permit the machine to operate at higher speed with less attention and to thereby further increase productivity.

11 Claims, 3 Drawing Figures

CIRCULAR KNITTING MACHINE WITH PATTERN WHEELS

Matter enclosed in heavy brackets [ ] appears in the original patent but forms no part of this reissue specification; matter printed in italics indicates the additions made by reissue.

---

*This is a continuation of Application Ser. No. 99,465, filed Dec. 18, 1970, now abandoned.*

BACKGROUND OF THE INVENTION

1. Field of the Invention

The invention relates to improvements in and to independent needle circular knitting machines, and in particular to improvements in and to such machines that employ slotted pattern wheels for the production of patterned cloth, such wheels being arranged in a predetermined manner with jacks for the selective actuation of the machine needles.

2. Description of the Prior Art

Known prior knitting machines having pattern wheels are as disclosed in U.S. Pat. No. 2,006,821, issued July 21,1935 (see in particular FIG. 4 thereof). Except for minor modifications thereto, the pattern wheel machine of U.S. Pat. No. 2,006,821 is still in manufacture today by the instant assignee.

It had long been recognized that there is a practical limit to the number of pattern wheel feed stations that may be accommodated about a given diameter circular knitting machine. [For example, with a 26-inch machine (i.e., cylinder diameter is 26 inches) and 2½ inch pattern wheels, the maximum number of feed stations thought to be possible was approximately 36 in number with each of the feed stations occupying approximately 3.14 inches of cylinder circumference. In such a machine, needles at each station are raised by a raise cam for eventual selective elevation by a pattern wheel.] To pack more feed stations about the needle cylinder, thereby to increase cloth production on such machine, has heretofore meant, in effect, to sharpen the steepness of the raise cams, and of the pattern wheel raise angles. [This however is impractical for the reason that the above noted machine already employs a cam raise angle of about 57°, and a pattern wheel raise angle of about 35°. To exceed about 57° of cam raise angle is to encourage needle butt breakage; to exceed about 35° of pattern wheel raise angle is to encourage jamming-and eventual breakage-of the needle butts within the pattern wheel slots, since such butts and slots cooperate like intermeshing gears, and therefore their respective pitches require control within close limits.] *There are, however, limits beyond which the cam raise angles and pattern wheel raise angles may not be increased. If the cam raise angles are too large, breakage of the needle butts engaging such cams is apt to occur, and if the pattern wheel raise angles are too large, jamming and eventual breakage of the needle butts within the pattern wheel slots is likely to occur since such butts and slots cooperate like intermeshing gears and therefore their respective pitches require control within close limits.*

SUMMARY OF THE INVENTION

To avoid the impasse of a fixed number of feed stations on a circular pattern wheel machine of a given diameter, as brought about by practical limits on the raise angles of raise cams and pattern wheels, the present invention proposes the following:

[Relocating the pattern wheels to their own cam free raceway; and utilizing two butts for needle raising purposes-one such butt being cooperative with the raise cams and the other such butt being cooperative, in tandem, with the pattern wheels; the butt which cooperates with the raise cams also being cooperative with stitch cams and with placer cams which are located between the raise and stitch cams.]

[Such a practice permits of acceptable cam and pattern wheel raise angles, say 57° and 35° respectively, but allows the formerly required 3.14 circumferential cylinder inches to be compressed to about 1.4 circumferential cylinder inches, thereby permitting of about 60 feed stations about a 26-inch machine (2½ inch pattern wheels), and permitting attendantly about double the cloth production as has been heretofore possible with a pattern wheel machine of equivalent diameter.]

*Relocating the pattern wheels of their own cam-free raceway, utilizing needle butts not engageable with the pattern wheels for needle raising and stitch drawing purposes, locating the raise and stitch cams under the planes of pattern wheels in positions such that, in each wheel, non-working edge portions straddling a working edge portion of the wheel respectively overlie the planes of working portions of raise and stitch cams associated with the wheel, and arranging the pattern wheels with their associated raise and stitch cam-pairs around the machine such that a non-working edge portion of each pattern wheel extending beyond its associated raise cam overlies the plane of a working portion of a stitch cam belonging to the cam pair of an adjacent pattern wheel. Substantially all waste space heretofore required to accommodate needle movement between pattern wheels and cams, and between cam sections supporting pattern wheels may thereby be eliminated and the needles caused to maintain engagement substantially continuously with the working portions of cams and working portions of pattern wheels.*

*Such practice enables a manufacturer to provide a great many more feeds about a pattern wheel machine of a particular diameter without increasing raise cam or pattern wheel angles and without decreasing the size of pattern wheels and permits of acceptable cam and pattern wheel raise angles, say 57° and 35°, respectively, thereby permitting of about 60 feed stations about a 26-inch machine (2½ inch pattern wheels) and permitting attendantly about double the cloth production as has been heretofore possible with a pattern wheel machine of equivalent diameter.*

Aside from [the matter of doubling] *greatly increasing* cloth production, the invention also intrinsically provides the capability for greater patterning within the cloth so produced. That is since machines incorporating the invention have a greater number of pattern wheels, than do equivalent-sized prior art machines, more pattern wheels slots are now available to influence any given needle during a single sweep of the needle cylinder, and hence pattern versatility is maximized.

In its preferred form, the invention utilizes two-butt needles, which admittedly are well known. In the relative travel of the needles with respect to a pattern wheel feed station, each lower needle butt initially meets a raise cam, which raises the needle, relative to its corresponding slot in the pattern wheel in question, and its upper butt above the jack (if any) in such slot. Then the needle moves generally laterally for a time, without additional rise, and "during this time" the pattern wheel slot corresponding with such needle moves inwardly and upwardly and any jack in the slot engages the upper needle butt to position the needle in a well known manner.

The object of the invention is to utilize more effectively the peripheral space about a circular knitting machine provided with slotted pattern wheels, whereby a greater number of feed stations than had heretofore been possible may be provided, and whereby cloth production by means of such a machine may be increased. As an added feature, the invention provides a pattern wheel cam section, dimensionally smaller than any heretofore known, which section *preferably* includes an adjustable cam for use in selectively effectively disabling the needle-selection capability of the pattern wheel of such section.

The invention will be described with reference to the figures wherein.

Figure 1:
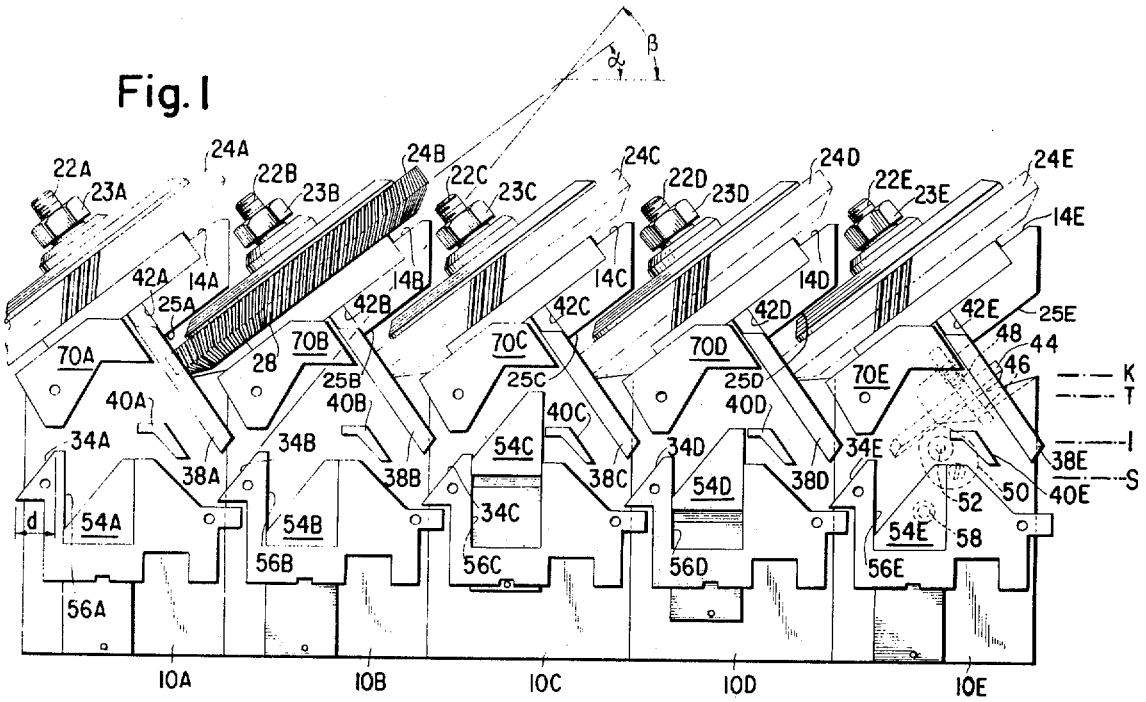
FIG. 1 is an elevational view of a plurality of pattern wheel cam sections according to the invention.
Figure 3:
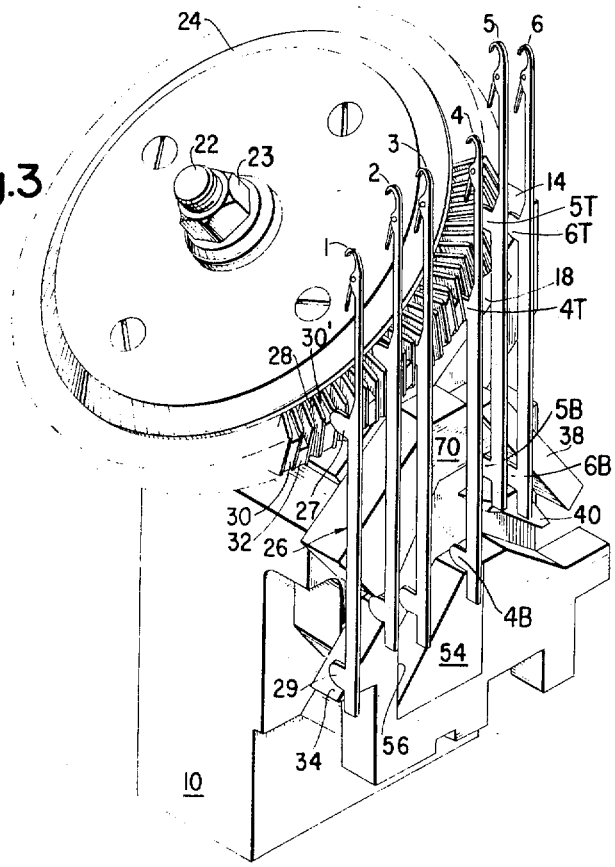
FIG. 3 is a perspective view of a pattern wheel cam section according to the invention, being useful for describing the operation of the invention.

With reference now to the figures, the means resulting in greater cloth production, and more versatility in patterning, will be described. Before proceeding with the description, however, it is well to realize that the views of FIGS. 1 and 3 are generally from within the needle cylinder, looking past the needle cylinder to the inner faces of cam sections according to the preferred form of the invention.

Figure 2:
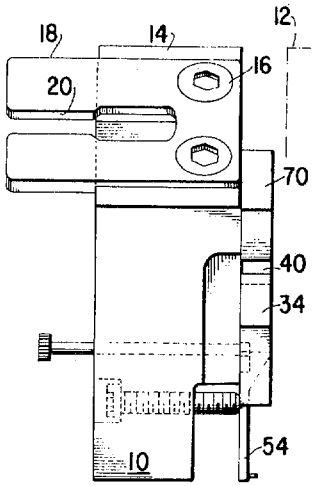
FIG. 2 is a side elevational view of a cam section embodying the invention, showing the means by which the pattern wheels mount.

A plurality of cam sections 10 (A through E) are accurately arranged about the periphery of the cylinder (12, FIG. 2) of a circular knitting machine, and each such section 10 is provided with an upper inclined face 14 (A through E). Mounted to each inclined face 14 by means of screws 16 is a fork 18 (A through E). The forks 18 have slots 20 for accommodating respective bolts 22 (A through E) which serve as journal bearings for respective pattern wheels 24 (A through E), the bolts 22 holding the pattern wheels to their respective forks 18 by means of respective nuts 23 (A through E).

The pattern wheels 24 are rotatable in planes parallel to the planes of their respective forks 18; and these planes form angles $\alpha$ with respect to the direction of relative travel of the machine needles 26. The pattern wheels 24 of adjacent cam sections are closely nested as shown in FIG. 1, with a non-working portion of the pattern wheel of one cam section 10 overlying the plane of a working portion of the preceding stitch cam 38, that is the stitch cam of the adjacent cam section engageable by needles before such overlying wheel, and the wheels 24 extend into slots 25 in such adjacent cam sections. *As may be seen from the drawing, each pattern wheel underlies and overlies the preceding next adjacent wheel and the following next adjacent wheel respectively, the wheels being of such magnitude that non-working edge portions extend at least substantially to positions of intersection with the axes of rotation of the adjacent wheels.* Each pattern wheel 24 is provided with slots 28, skewed with respect to the plane of pattern wheel rotation; and the skewing and rotation planes are so chosen that the slots 28 may fully intermesh with the needles 26 when such slots 28 are vertically disposed and adjacent the needle cylinder 12. [As above noted, it has been found that a pattern wheel rotation plane which makes an angle $\alpha$, relative to the direction of needle travel, greater than about 35° tends to bind and clog with needles, to the detriment not only of such needles, but of the pattern wheel itself.] Each pattern wheel slots may-as is conventional-be filed with a high jack 30, or with a low jack 32, or with no jack depending on whether it is desired to raise a respective needle to knit, tuck or welt knitting height.

The illustrated cam sections 10 are each provided with a needle raise cam 34 (A through E) having a raise angle $\alpha$ [of about 57° (above noted to be about the steepest raise angle practical without causing needle butt damage)] and the needles 26—which have respective upper and lower butts 27 and 29 respectively—are adapted to have their butts 29 ride up, and on, each raise cam 34. The lateral length d of the raise cams 34 is sufficiently short to permit each needle 26 to be sufficient rapidly raised so that its respective upper butt 27 is above, in elevation, and waiting for the pattern wheel slot that it will eventually, and in tandem, mesh with as such slot relatively slowly comes inwardly and upwardly to meet and selectively raise the upper butt 27 of such needle. *The line 1 in FIG. 1 indicates the level of the top of the bottom needle butts when elevated to the top of a raise cam 34 and into a position for introduction of the top butts to the pattern wheel.*

After pattern wheel selection of the respective needles, such needles travel laterally of the cam sections 10 to engage and be lowered by either a respective stitch draw cam 38 (A through E), or a *wing* cam 40 (A through E). In the event that a needle is raised by means of a high jack 30, such needle engages its stitch cam at, say, a level K; in the event a needle is raised by means of a low jack 32, such needle engages its stitch cam at, say, a level T; in the event a needle is not raised by means of a pattern wheel jack, such needle gets lowered to welt height by means of the cam 40, which cam 40 is compressible into the section 10, in a well known manner, to prevent needle butt breakage caused by needle "flying" out of their respective welt paths.

Each stitch draw cam 38 is adapted to ride in a respective slot 42 (A through E) of its respective cam sections 10 for stitch length determining purposes. Referring, for example, to section 10E of FIG. 1, as representative of all such cam sections, a rod 44 rigidly secures to the stitch cam 38E, which rod 44 is provided with a hole for slidably accommodating a pin 46. The pin 46 secures to the section 10E, and a compression spring 48 urges the rod (and naturally the cam 38E) downwardly along the axis of the pin 46. An eccentric 50, rotatable about an axis 52 is adapted to bear against and urge the rod 44 upwardly, thereby compressing the spring 48, for stitch length setting purposes. *The line S in FIG. 1 indicates the level of the top of the bottom needle butts when the stitch cam is adjusted to draw the needles to the maximum possible stitch length.*

A manually settable placer cam 54 (A through E), for use in cancelling out all TUCK and WELT, or all WELT, selections of a given pattern wheel 24 is adapted to be cradled in a U-shaped cutout 56 (A through E), being positionable to wipe out all TUCK and WELT pattern wheel selections (see, for example, section 10C) or to wipe out all WELT pattern wheel selections (see for example, section 10D). The positioning of such cams 54, though not shown, may conventionally be by means of a pinion and ratchet, which pinion is on an axis 58, and which ratchet is on the cam 54E.

Referring now to FIG. 3, the operation of a cam section incorporating the invention will be described, with special emphasis being placed on how the number of pattern wheel feed stations about a circular knitting machine may be increased over equivalent prior art machines, whereby greater machine productivity and patterning versatility may be had. Shown are six two-butt latch type needles numbered 1 through 6, the upper butts 27 thereof having, in the description which follows, the suffixes T, and the lower butts 29 having the suffixes B. The needle 1 is shown first entering the cam section 10 with its lower butt 1B engaging the raise cam 34, at which time its corresponding pattern wheel slot, i.e. the one having the high jack 30', is sufficiently apart from and below the upper needle but 1T that the jack and upper needle butt do not engage. The cam 34, then relatively rapidly (i.e., compared with the rise of the pattern wheel slot in question) drives the needle upwardly so that the needle assumes the position of the needle 2, the lower butt 2B of such needle 2 riding almost to the apex of the raise cam 34, with the upper butt 2T thereof in its corresponding pattern wheel slot (as shown) or above such slot (depending upon the angular difference between the raise cam and pattern wheel), but in any event with the butt 2T above the jack (if any) in the slot. The cam 34 then releases the lower needle butt 2B and, as the needle cylinder 12 carries the needle 2 laterally of the section 10 to the position occupied by the needle 3, the pattern wheel slot corresponding with such needle moves to cause the jack therein to come up to engage the underside of upper needle butt 3T. With no jack in the pattern wheel slot corresponding with a given needle, the needle passes along like the needle 4, the upper butt 4T slipping out of its pattern wheel slot as such slot moves up and away from the upper needle butt 4T, the lower butt 4B thereof ultimately engaging the cam 40 and being lowered thereby to welt height; with a high jack in the pattern wheel slot corresponding with a given needle, the needle gets carried upwardly by means of its upper butt, and passes along like the needle 5, the lower butt 5B riding just beneath a guard cam 70 until it meets and is lowered by the stitch cam 38; similarly, a low jack in the pattern wheel slot corresponding with a given needle causes such needle to pass along like the needle 6, the lower needle butt 6B being lowered by the cam 38 as the upper butt 6T of such needle slips out of its corresponding pattern wheel slot. Guard cam 70 restricts the uncontrolled upward movement of needles from the raise and placer cams.

*With reference to the lines S, 1 and K in FIG. 1, it will be apparent that the raise cams 34 are effective to raise the knitting needles less than one-third of the maximum total stroke capable of being imparted to said needles by the combined effect of the raise cam and the pattern wheel. Stated differently, the raise cam is adapted to lift needles a distance less than one-half the maximum distance which the pattern wheel is capable of raising the needles.*

*It will also be apparent from FIG. 1 that the total space requirements of each cam section peripherally of the cylinder is not substantially greater than that occupied by the needle butt contacting surfaces of the raise cam, the pattern wheel and the stitch cam which act to change the elevation of the needles.*

*Considering a plurality of serially adjacent cam sections, the total space requirements is not substantially greater than that occupied by the raise cams, pattern wheels and stitch cams which act to change the elevation of the needles of said plurality of serially adjacent cam sections.*

While the invention has been described in its preferred form it is to be understood that the words which have been used are words of description rather than of limitation, and that changes within the purview of the appended claims may be made without departing from the true scope and spirit of the invention [bearing in mind that the key to the invention is the use, in a pattern wheel circular knitting machine, of one needle butt for actuation only by cams and the use of a second needle butt for actuation only by pattern wheels].

Having thus set forth the nature of this invention, what I claim herein is:

[1. A circular knitting machine of the type having a cylinder provided with peripheral slots for accommodating knitting instrumentalities, and a plurality of relatively rotatable cam sections cooperative with said cylinder, at least some adjacent cam sections (10) being provided with respective pattern wheels (24), each of said pattern wheels being of the type having its plane of rotation at an angle ($\alpha$) with respect to the direction of relative cylinder travel and being provided with skewed jack accommodating slots for use in raising certain of said knitting instrumentalities of said cylinder to various predetermined heights, said machines being characterized in that:

(a) at least some of said knitting instrumentalities are provided with first and second butts, (b) said adjacent cam sections (10) with pattern wheels (24) are further provided with a raise cam, a stitch cam, a placer cam between the raise and stitch cam underlying an effective portion of the pattern wheel of the cam section, and a guard cam disposed to restrict the upward movement of knitting instrumentalities from the raise cam and placer cam, the pattern wheels of said adjacent cam sections being closely nested with a non-working portion of the pattern wheel of one cam section overlying the plane of a working portion of the stitch cam of the adjacent cam section encountered by the knitting instrumentalities before entering said one cam section, (c) each of the raise, placer and stitch cams being disposed for cooperation only with said first butt of each of those knitting instrumentalities with first and second butts, and each of said pattern wheels being disposed for cooperation only with said second butt of each of said knitting instrumentalities with first and second butts.]

[2. The apparatus of claim 1 wherein each of said cam sections provided with pattern wheels has its raise cam at an angle ($\beta$) with respect to the direction of relative cylinder travel such angle ($\beta$) being greater than the raise angles ($\alpha$) of the pattern wheels.]

[3. The apparatus of claim 1 wherein each pattern wheel of one cam section having a non-working wheel portion overlying the plane of a working portion of the stitch cam of the adjacent cam section encountered by knitting instrumentalities before entering said one cam section extends into a slot in said adjacent cam section.]

[4. The apparatus of claim 1 wherein said placer cams for at least some of said cam sections with pattern wheels are adjustable, such cams being adapted for vertical positioning.]

[5. Apparatus for use in controlling the needles of a circular knitting machine, which needles are provided with lower and upper butts comprising:

(a) a cam section block (10) for supporting needle actuating cams, (b) a slotted pattern wheel angularly disposed relative to the vertical axis of such section block (10) and adapted to have its periphery cooperate with only the upper butts of said needles for selectively raising same, said pattern wheel having a non-working portion extending beyond said cam section block (10) to overlie the plane of the working portion of a stitch cam on another cam section block when such another cam section block is adjacent the first mentioned cam section block (10) and in a position for cams thereon to actuate the needles in advance of cams on the first mentioned cam section block (10).

(c) a raise cam for the cam section block (10) adapted to cooperate with only the lower butts of said needles and being disposed in advance of the effective periphery of said pattern wheel in the direction of relative needle travel, (d) a stitch cam for the cam section block (10) adapted to engage only said lower needle butts to lower same to set stitches selected by said pattern wheel, a placer cam for the cam section block (10) between the raise cam and stitch cam, said placer cam being adapted to engage only said lower needle butts, and (e) a guard cam for the cam section block (10) disposed to restrict the upward movement of knitting needles from the raise cam and placer cam.]

[6. The apparatus of claim 5, wherein said placer cam is adapted for vertical positioning relative to said pattern wheel.]

[7. The apparatus of claim 1 wherein said stitch cams for at least some of said cam sections with pattern wheels are adjustable, such cams being adapted for planar movement whereby the length of stitches producible by the engagement of knitting instrumentalities with the cams may be changed.]

[8. The apparatus of claim 5 wherein said stitch cam for said cam section block (10) is adjustable, such cam being adapted for planar movement whereby the length of stitches producible by the engagement of the needles with the cam may be changed.]

*9. A circular knitting machine of the type having a cylinder provided with peripheral slots for accommodating latch type knitting instrumentalities, and at least three relatively rotatable serially adjacent cam sections cooperative with said cylinder, said adjacent cam sections being provided with respective pattern wheels, each of said pattern wheels being of the type having its plane of rotation at an angle with respect to the direction of relative cylinder travel and being provided with skewed jack accommodating slots for use in raising certain of said instrumentalities of said cylinder to various predetermined heights, said machines being characterized in that:*

*a. the total space requirements of said three serially adjacent cam sections peripherally of the cylinder is not substantially greater than that occupied by the needle butt contacting surfaces of the raise cams, the pattern wheels and the stitch cams which act to change the elevation of the needles of said three adjacent cam sections.*

*b. at least each of some of said knitting instrumentalities are provided with first and second butts,*

*c. said adjacent cam sections with pattern wheels are further provided with a low raise cam adapted to raise the first butts of knitting instrumentalities to a pattern wheel introduction elevation in which the second butts thereof are positioned for accommodation into mesh with the pattern wheel slots, a stitch cam to lower knitting instrumentalities to a stitch making position, a placer cam between the raise and stitch cam underlying an effective portion of the pattern wheel of the cam section, a wing cam to lower knitting instrumentalities other than the knitting instrumentalities raised by the pattern wheel from said pattern wheel introduction elevation to a welt position, and a guard cam disposed to restrict the upward movement of knitting instrumentalities from the raise cam and placer cam, the pattern wheels of said adjacent cam sections being closely nested with a non-working portion of the pattern wheel of one cam section overlying the plane of a working portion of the stitch cam of the adjacent cam section encountered by the knitting instrumentalities before entering said one cam section.*

*d. each of the raise, placer and stitch cams being disposed for cooperation only with said first butt of each of those knitting instrumentalities with first and second butts, and each of said pattern wheels being disposed for cooperation only with said second butt of each of said knitting instrumentalities with first and second butts, said raise cam being effective to raise said knitting instrumentalities less than one third of the maximum total stroke capable of being imparted to said needles by the combined effect of the raise cam and the pattern wheel, the raise and stitch cams in each cam section being spaced apart a distance not substantially greater than that required to have interposed between working portions thereof the working edge portion of the overlying pattern wheel.*

*10. The apparatus of claim 9 wherein each of said cam sections provided with pattern wheels has its raise cam at an angle ($\beta$) with respect to the direction of relative cylinder travel, such angle ($\beta$) being greater than the raise angles ($\alpha$) of the pattern wheels.*

*11. The apparatus of claim 9 wherein each pattern wheel of one cam section having a non-working wheel portion overyling the plane of a working portion of the stitch cam of the adjacent cam section encountered by knitting instrumentalities before entering said one cam section extends into a slot in said adjacent cam section.*

*12. The apparatus of claim 9 wherein said placer cams for at least some of said cam sections with pattern wheels are adjustable, such cams being adapted for vertical positioning.*

*13. Apparatus for use in controlling the needles of a circular knitting machine, each of which needles is provided with lower and upper butts and by which that compactness of each assembly is attainable which is necessary to accommodate on a 26-inch diameter knitting machine at least 60 such assemblies each operative to effect*

*selectively at least three positions of pattern wheel influence, said assembly comprising:*

*a. a cam section block for supporting needle actuating cams,*

*b. a slotted pattern wheel angularly disposed relative to the vertical axis of such section block and adapted to have its periphery cooperate with only the upper butts of said needles for selectively raising said needles to a variety of heights including a height in which the needles so selectively raised will thereafter knit, said pattern wheel having a non-working portion extending beyond said cam section block to overlie the plane of the working portion of a stitch cam on another cam section block when such another cam section block is adjacent to the first mentioned cam section block and in a position for cams thereon to actuate the needles in advance of cams on the first mentioned cam section block,*

*c. a low raise cam for the cam section block adapted to cooperate with only the lower butts of said needles and being disposed in advance of the effective periphery of said pattern wheel in the direction of relative needle travel, the low raise cam being adapted to raise needles to a pattern wheel introduction elevation by imparting an upstroke to said needles of less than one-third of the total upstroke imparted by the successive action of said raise cam and said pattern wheel when raising needles to a height in which the needles so selectively raised will thereafter knit,*

*d. a stitch cam for the cam section block for lowering needles raised by the pattern wheel and adapted to engage only said lower needle butts to lower same to set stitches selected by said pattern wheel, the total space requirements of said cam section block peripherally of said circular knitting machine being not substantially greater than that occupied by the needle butt contacting surfaces of the raise cam, the pattern wheel and the stitch cam which act to change the elevation of the needles, a placer cam for the cam section block between the raise cam and stitch cam, said placer cam being adapted to engage only said lower needle butts,*

*e. a guard for the cam section block disposed to restrict the upward movement of knitting needles from the raise cam and placer cam,*

*f. a wing cam disposed to engage the lower butts of needles other than the needles raised by the pattern wheel and lower such needles from said pattern wheel introduction level to a welt level, and said placer cam, said wing cam and said guard cam being arranged on each cam section so as not to require any increase in said total space requirements of said cam section block peripherally of said circular knitting machine.*

*14. The apparatus of claim 13, wherein said placer cam is adapted for vertical positioning relative to said pattern wheel.*

*15. The apparatus of claim 9 wherein said stitch cams for at least some of said cam sections with pattern wheels are adjustable, such cams being adapted for planar movement whereby the length of stitches producible by the engagement of knitting instrumentalities with the cams may be changed.*

*16. The apparatus of claim 13 wherein said stitch cam for said cam section block is adjustable, such cam being adapted for planar movement whereby the length of stitches producible by the engagement of the needles with the cam may be changed.*

*17. A circular knitting machine of the type having a cylinder provided with peripheral slots for accommodating latch type knitting needles, and a plurality of cam sections arranged about said knitting machine periphery each cam section carrying a cam-group comprising a raise cam, a wing cam and a stitch cam, said cam sections being relatively and cooperatively rotatable with respect to said cylinder, a pattern wheel carried by each cam section and provided with jacks for use in raising needles in said cylinder slots as determined by the jacks in the wheel, said pattern wheels being mounted for rotation on individual axes and each pattern wheel having working and non-working edge portions in cooperative association with one of said cam-groups, said machine being characterized in that:*

*a. the total space requirements of each of said cam sections peripherally of the cylinder is not substantially greater than that occupied by the needle butt contacting surfaces of the raise cam, the pattern wheel and the stitch cam which act to change the elevation of the needles,*

*b. at least each of some of said needles are provided with one butt to engage the pattern wheels and at least one butt to engage the cams of said cam-groups,*

*c. adjacent pattern wheels are closely nested with their planes of rotation substantially parallel,*

*d. each of said cam-groups is mounted under the plane of an associated pattern wheel, and in each cam-group the raise cam is adapted to lift needles a distance less than one-half of the maximum distance which said pattern wheel is capable of raising needles to a pattern wheel introduction elevation, the wing cam is formed with an effective surface located to engage and lower the butts of needles other than those needles raised by the pattern wheel associated with the cam-group to thereby lower such needles from said pattern wheel introduction elevation to a welt position, and the stitch cam is formed with a surface located to engage the butts of needles selected by said pattern wheel to lower said needles to a stitch forming position, means supporting said wing cam with the effective needle butt engaging surface thereof located substantially vertically beneath the needle butt engaging surface of said stitch cam, so that said wing cam does not impose any additional space requirement on said cam section peripherally of the cylinder beyond that space occupied by the operational surfaces of the raise cam, the pattern wheel and the stitch cam, and*

*e. the pattern wheels with their associated cam-groups are arranged around the cylinder of the machine such that a non-working edge portion of each pattern wheel extending beyond its associated raise cam overlies the plane of a working portion of a stitch cam of a cam-group associated with a next adjacent pattern wheel.*

*18. A circular knitting machine as defined in claim 17 wherein non-working edge portions of each wheel straddle the working edge portion of the wheel and respectively overlie the planes of working portions of the raise and stitch cam associated with the wheel.*

*19. A circular knitting machine as defined in claim 17 wherein diametrically opposite non-working edge portions of each wheel extend at least substantially to positions of intersection with the axes of rotation of each next adjacent pattern wheel.*

* * * * *